US009867218B2

United States Patent
Debates et al.

(10) Patent No.: US 9,867,218 B2
(45) Date of Patent: *Jan. 9, 2018

(54) CONNECTING WIRELESS DEVICES USING VISUAL IMAGE CAPTURE AND PROCESSING

(71) Applicant: GOOGLE TECHNOLOGY HOLDINGS LLC, Mountain View, CA (US)

(72) Inventors: Scott P. Debates, Crystal Lake, IL (US); Francis W. Forest, Chicago, IL (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/144,555

(22) Filed: May 2, 2016

(65) Prior Publication Data

US 2016/0249394 A1    Aug. 25, 2016

Related U.S. Application Data

(63) Continuation of application No. 14/446,673, filed on Jul. 30, 2014, now Pat. No. 9,332,578.

(51) Int. Cl.

| H04B 7/00 | (2006.01) |
| H04W 76/02 | (2009.01) |
| H04W 4/00 | (2009.01) |
| H04L 29/12 | (2006.01) |
| G06K 9/64 | (2006.01) |

(Continued)

(52) U.S. Cl.
CPC ........ *H04W 76/02* (2013.01); *G06K 9/00664* (2013.01); *G06K 9/64* (2013.01); *H04L 61/6022* (2013.01); *H04N 7/181* (2013.01); *H04W 4/008* (2013.01); *H04W 8/005* (2013.01)

(58) Field of Classification Search
CPC .. H04B 10/144; H04B 10/1149; H04N 7/183; H04N 7/188; H04M 1/7253; H04M 2250/52; G06K 7/1452; G06K 9/00013; G06K 9/20
USPC ...... 455/41.1, 41.2, 41.3, 410, 411; 340/5.1, 340/5.2, 5.21, 5.61
See application file for complete search history.

(56) References Cited

U.S. PATENT DOCUMENTS

| 8,405,729 B2 | 3/2013 | Jain |
| 8,849,200 B2 | 9/2014 | Svensson et al. |
| 2013/0204939 A1 | 7/2013 | Staskawicz |

*Primary Examiner* — Quochien B Vuong
(74) *Attorney, Agent, or Firm* — Morgan, Lewis & Bockius LLP

(57) ABSTRACT

A method facilitates establishment of wireless pairing connections between wireless electronic devices by: initiating, at a first device, a connection utility that enables the first device to establish a wireless connection with at least one second device; capturing an image of a selected second device, representing a second device to which a wireless connection is desired; and scanning for identifying information about each discoverable second device that is within a connection range of the first device. The method further includes: forwarding the captured image and any detected identifying information to a wireless connectivity assist (WCA) service; receiving wireless connection setup and configuration (WCSC) instructions from the WCA service; and establishing the wireless connection with the selected second device utilizing wireless connection setup and configuration (WCSC) instructions received from the WCA service.

20 Claims, 8 Drawing Sheets

(51) Int. Cl.
*G06K 9/00* (2006.01)
*H04N 7/18* (2006.01)
*H04W 8/00* (2009.01)

| Manufacturer | Model/Device Type | MAC ID | Correlation Score | Image 1 | Image N | WCSC Instructions |
|---|---|---|---|---|---|---|
| Broadcom | BT Dell laptop | CC:52:af:89:57:04 | 3 | Keyboard | Closed laptop | 1. Make sure Laptop is powered on.<br>2. Enable Bluetooth in windows control panel<br>3. Enable Bluetooth discovery mode in the Bluetooth Settings<br>4. Select Settings from phone apps menu<br>5. Select Bluetooth<br>6. Turn on Bluetooth if not on already<br>7. Select search for devices<br>8. Select dell laptop from devices discovered.<br>9. Enter passcode if laptop configured with passcode.<br>10. Device is paired and ready to share data/audio. |
| Motorola | BT Headset | 08:08:9F:22:33:44 | 5 | Side Image | Front Image | 1. Press and hold BT headset's power button until the device led is a solid Blue.<br>2. Select Settings from phone apps menu.<br>3. Select Bluetooth<br>4. Turn on Bluetooth if not on already<br>5. Select search for devices<br>6. Select Motorola BT Headset<br>7. Device is paired and ready to stream audio. |
| FitBit | Wrist Monitor | 17:9E:7A:C4:42:DC | 2 | Top Image | Side Image | 1. Power on Wrist Monitor<br>2. Select Settings from phone apps menu.<br>3. Select Bluetooth<br>4. Turn on Bluetooth if not on already<br>5. Select search for devices<br>6. Select FitBit Wrist Monitor<br>7. Device is connected and ready to share data. |
| BMW | Handsfree Car dash | 00:01:A9:XX:XX:XX | 2 | Dash | Manual | 1. Make sure BMW ignition is turned on.<br>2. Press the menu button in the middle of the console to bring up the menu.<br>3. Select Enable Bluetooth from the menu.<br>4. Select Bluetooth discovery inside in the Bluetooth Settings<br>5. Select Settings from phone apps menu.<br>6. Select Bluetooth<br>7. Turn on Bluetooth if not on already<br>8. Select search for devices<br>9. Select BMW from devices discovered.<br>10. Enter passcode displayed on the BMW console.<br>11. Device is paired and ready to share data/audio. |
| Cisco/Linksys | WiFi AP Router | 08:9C:41:XX:XX:XX | 4 | Side Image | Top Image | 1. Make sure Cisco/Linksys WiFi AP is powered.<br>2. Select Settings from phone apps menu.<br>3. Select WiFi<br>4. Turn on WiFi if not on already<br>5. Select search for devices<br>6. Select Cisco/Linksys WiFi AP<br>7. Enter passcode if a passcode is used.<br>8. Connected to Cisco/Linksys WiFi AP. |
| Belkin | WiFi AP Router | 08:36:39:XX:XX:XX | 5 | Side Image | Top Image | 1. Make sure Belkin WiFi AP is powered.<br>2. Select Settings from phone apps menu.<br>3. Select WiFi<br>4. Turn on WiFi if not on already<br>5. Select search for devices<br>6. Select Belkin WiFi AP<br>7. Enter passcode if a passcode is used.<br>8. Connected to Belkin WiFi AP. |

FIG. 4

CONNECTING WIRELESS DEVICES USING VISUAL IMAGE CAPTURE AND PROCESSING

CROSS-REFERENCE TO RELATED APPLICATION

This application is a continuation of U.S. patent application Ser. No. 14/446,673, filed Jul. 30, 2014, now U.S. Pat. No. 9,332,578, entitled "Connecting Wireless Devices Using Visual Image Capture and Processing", which is herein incorporated by reference.

BACKGROUND

Technical Field

The present disclosure generally relates to wireless user devices, and in particularly to a method and system for facilitating wireless connectivity between two devices using visual image capture to identify a second of the two devices and retrieve a correct wireless connection setup process for the second device.

Description of Related Art

Smart phones and other wireless user devices are commonly designed with a camera that enables the device to capture visual images. These wireless user devices are also configured with the capability to wirelessly connect a first device to another device within certain proximity of the first device and thereby communicate information with the other device. Examples of such wireless connections and/or protocols include near field communication (NFC) or Bluetooth® or Wireless fidelity (WiFi). The establishment of these wireless connections requires a handshake operation in which certain setup procedures are implemented at the first device and/or the other device to enable the connection. Given the large number and variations in the available second devices, occasionally, the first device cannot complete the handshake with a particular second device because the first device and/or the device user does not have the required setup and/or configuration information required to complete the handshake for that particular second device.

BRIEF DESCRIPTION OF THE DRAWINGS

The description of the illustrative embodiments is to be read in conjunction with the accompanying drawings, which provide specific examples that are not intended to limit the scope of the disclosure, and wherein:

FIG. 4 provides a second view of the example device pairing environment, illustrating directional flow of various information packages via wireless mediums between the first devices and the WCA service, in accordance with one or more embodiments;

DETAILED DESCRIPTION

Figure 1:
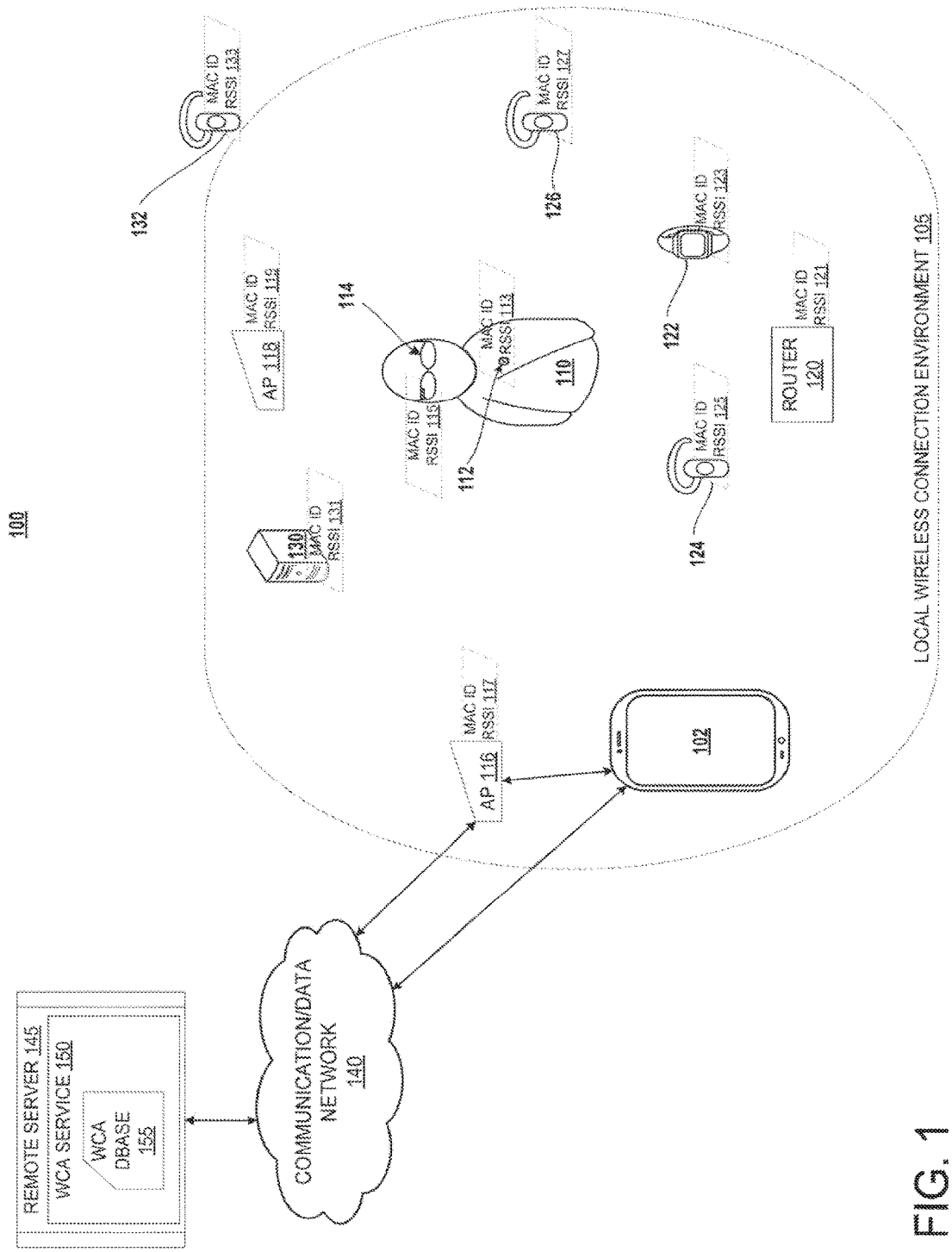
FIG. 1 illustrates an example device pairing environment in which a wireless connection assist (WCA) service can be utilized to facilitate a short-range wireless connection between a first wireless device, such as a mobile phone, and a selected second device by utilizing an image of the selected second device to identify the correct wireless connection setup and configuration (WCSC) instructions, according to one or more embodiments.

The illustrative embodiments of the present disclosure provide a wireless device and a method performed within a wireless device that facilitates establishment of wireless pairing connections between the wireless device and a second device. According to one aspect, the method includes: initiating, at a first device, a connection utility that enables the first device to establish a wireless connection with at least one second device; in response to a received input for image capture, capturing an image of a selected second device, representing a second device to which a wireless connection is desired; and scanning for identifying information about each discoverable second device that is within a connection range of the first device. The method further includes: forwarding the captured image and any detected identifying information to a wireless connectivity assist (WCA) service; and establishing the wireless connection with the selected second device when wireless connection setup and configuration (WCSC) instructions are received from the WCA service.

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

The description of the illustrative embodiments can be read in conjunction with the accompanying figures. Embodiments incorporating teachings of the present disclosure are shown and described with respect to the figures presented herein. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

FIG. 1 illustrates an example device pairing environment 100 in which a wireless connection assist (WCA) service 150 can be utilized to facilitate a short-range wireless connection between a first wireless device 102, such as a mobile phone, and a selected second device (e.g., Bluetooth (BT) headset 124) by utilizing an image of the selected second device (124) to identify the correct wireless connection setup and configuration (WCSC) instructions, according to one or more embodiments. Device pairing environment 100 includes local wireless connection environment 105 which represents the surrounding area of a first device 102 within which one or more second devices are in pairing communication range (i.e., close enough to complete a local pairing with the first wireless device 102. For simplicity, first wireless device 102 shall be referred to as first device 102. While illustrated as a mobile phone, it is appreciated that first device 102 can be any one or a number of different devices and/or device types that supports wireless pairing to a second device in proximity of the first device 102.

Local wireless connection environment (LWCE) 105 includes a plurality of second devices to which first device 102 can be paired. Among the illustrated second devices are wearable camera 112, wearable eyeglasses 114, such as Google® Glass, both worn by a user 110, first Access Point (AP) 116, second AP 118, router 120, wearable smart watch 122, first BT headset 124, second BT headset 126, and computer 130. Each second device within LWCE 105 has a corresponding machine identifier (MAC ID) that is broadcasted from the device when the device is on and/or in pairing mode. The second devices broadcast their respective MAC IDs with a particular signal strength that is detectable by the first device 102 and attributed with a received signal strength indicator (RSSI) relative to the first device 102. The MAC ID and corresponding RSSI values are illustrated numbered sequentially with the device to which they belong, and include MAC ID RSSI 113, 115, 117, 119, 121, 123, 125, 127, and 131 corresponding to second devices 112, 114, 116, 118, 120, 122, 124, 126, and 130.

Notably, in addition to first and second BT headsets 124, 126, a third BT headset 132 is illustrated outside of LWCE 105 as an example second device to which first device 102 is not currently able to wirelessly connect. Third BT headset 132 has MAC ID RSSI 133, which is undetectable to first device 102 from within LWCE 105.

First device 102 is able to connect to and exchange communication with WCA service 150 via communication and data network (CDN) 140. Connection with or to CDN 140 can be via direct wireless network service or a secondary internet based network accessible to first device 102 via AP 116, for example. The two-way connectivity paths are illustrated as bi-directional arrows. WCA service 150 is hosted on remote server 145 and includes WCA database 155 illustrated by FIG. 5. Descriptions of the remote server 145 and WCA database 155 are presented below within the descriptions of FIGS. 3 and 4.

Figure 2:
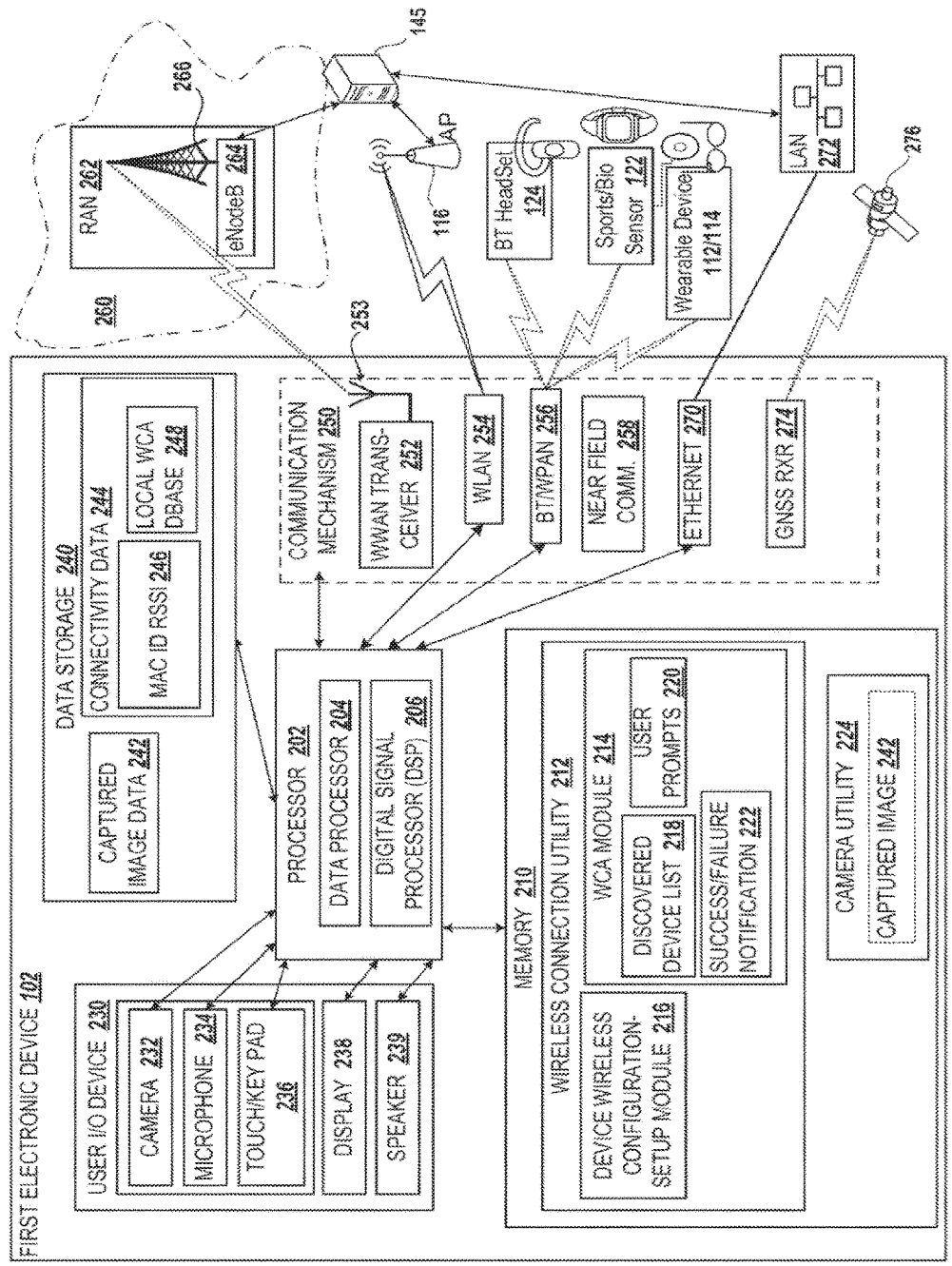
FIG. 2 provides a more detailed view of functional components of the first device, represented as a mobile phone, which supports wireless connectivity with both a near-by second device and a remote WCA service, in accordance with one or more embodiments.

FIG. 2 provides a more detailed view of functional components of the first device 102, represented as a wireless communication device such as a mobile phone, which supports wireless connectivity with both a near-by second device and a remote WCA service 150, in accordance with one or more embodiments. While illustrated and occasionally referred to as a mobile phone, first device 102 can be one of a host of different types of user communication devices, including but not limited to, a smart-phone, a desktop computer, a laptop, a net-book, an ultra-book, and/or a tablet computing device. The various devices provide and/or include the necessary hardware and software to support the various wireless or wired communication functions as part of device pairing environment 100.

First device 102 includes an integrated circuit (IC) processor 202, which connects via a plurality of bus interconnects (illustrated by the bi-directional arrows) to a plurality of functional components of first device 102. Processor 202 can include one or more programmable microprocessors, such as a data processor 204 and a digital signal processor (DSP) 206, which, in some embodiments, may both be integrated into a single processing device. Processor 202 controls the communication, application data processing and signal processing, user interfacing, and other functions and/or operations of first device 102. Connected to processor 202 is memory 210, which can include volatile memory and/or non-volatile memory. One or more executable applications or programmed utilities can be stored within memory 210 for execution by data processor 204 or in certain signal processing scenarios by DSP 206. For example, memory 210 is illustrated as containing a wireless connection utility 212, which includes wireless connection/connectivity assist (WCA) module 214 and a device wireless configuration setup (WCS) module 216. WCA module 214 includes discovered device list 218, user prompts 220, and success/failure notification 222. The associated functionality and/or usage of each of the software modules will be described in greater detail within the descriptions which follow. Memory 210 also includes a camera (or image capture) utility 224, which can temporarily store a captured image 242. It is appreciated that memory 210 can also include other applications and/or services (not shown). In alternate embodiments, one or more of the utilities illustrated within memory 210 can exist as firmware in other locations within first device 102 and be utilized for controlling the operations of or execution by other controllers or specialized or dedicated processors within first device 102.

First device 102 can include one or more input/output (I/O) devices 230 that operate as user interface devices. These I/O devices 230 can include one or more input devices, such as camera 232, microphone 234, and touch screen and/or touch pad and/or keypad 236. The I/O devices 230 can also include one or more output devices, such as display 238 and speaker 239. The input devices can be utilized to access applications on the first device 102, such as WCS module 216 and enter and/or update values programmed therein.

First device 102 also includes data storage 240 that stores one or more data utilized during operation of first device 102. Data storage 240 is also coupled to processor 202 and can be any type of available storage device that is integral, attachable or insertable and capable of storing one or more application software and data. It is further appreciated that in one or more alternate embodiments, data storage 240 can actually be remote storage and not an integral part of the first device 102. Among the stored data are captured image data 242 and connectivity data 244. Connectivity data 244 includes MAC ID RSSI data pairs 246 and connection parameters 248 associated with specific connection to second devices.

As illustrated, first device 102 is capable of supporting multiple different forms of communication using several different technologies, according to a plurality of alternate embodiments. To support wireless communication, first device 102 has at least one and preferably multiple of the different components that are illustrated within communication mechanism(s) 250. Communication mechanism(s) 250 includes wireless wide area network (WWAN) transceiver 252 with connected antenna 253, which enables first device 102 to communicate with a radio access network (RAN) 262 of a cellular network 260, which can be synonymous with communication and data network 140 (FIG. 1) for continuity with the FIG. 1 description. For simplicity, one connected antenna 253 of WWAN transceiver 252 is depicted. However, WWAN transceiver 252 may be associated with more than one antenna 253, each antenna having one or more selected bandwidths of operation to support different modes of communication or for simultaneous communication in different communication technologies. RAN 262 is generally represented as including a base station, depicted as an evolved base node ("eNodeB") 264 that transmits and receives communication signals over a base station antenna 266. The eNodeB 264 is illustrated communicatively connected to server 145, which is an example computing device on which the WCA service 150 (FIG. 1) is hosted.

In addition to WWAN transceiver 252 and associated components, first device 102 can include a wireless local area network (WLAN) module 254 to communicate with server 145 and/or wireless networks accessible via wireless access point 116. As an example, the WLAN module 254 may support IEEE 802.11 standards with the access point 116 operating as a WiFi hotspot. First device 102 can also include one or more close range wireless communication technology modules, including a wireless personal access network (WPAN) or Bluetooth® transceiver 256 for communication with WPAN devices, depicted as a Bluetooth® headset 124, a sports/biometric/physiological sensor, illustrated as watch 122, and other wearable device/s 112/114 (such as heads up display, camera, camera-equipped eyeglasses, etc.). WPAN transceiver 256 can support technologies such as Infrared Data Association (IrDA) standard, Wireless Universal Serial Bus (USB), Bluetooth®, Z-Wave, ZigBee, Body Area Network, and ANT+. Alternatively or in addition, close range wireless communication provided by first device 102 can include a near field communication (NFC) transceiver 258, such as can be utilized for exchanging files with another user device, such as wearable device 112/114. Alternatively or in addition, first device 102 can also include components for wired communication, such as Ethernet module 270 for connecting to a local area network (LAN) 272. As further shown, first device 102 can also include a global navigation satellite system (GNSS) receiver (RXR) 274, which can receive signals from GNSS satellite 276 in order to provide location information. It is appreciated that the location of first device can also be obtained or determined via network-assisted WiFi trilateration. This location information can be utilized in one embodiment to determine whether the current location of the first device 102 has a bearing on the type of connectivity access that can be provided to a second device (i.e., geographic restrictions may apply).

Figure 3:
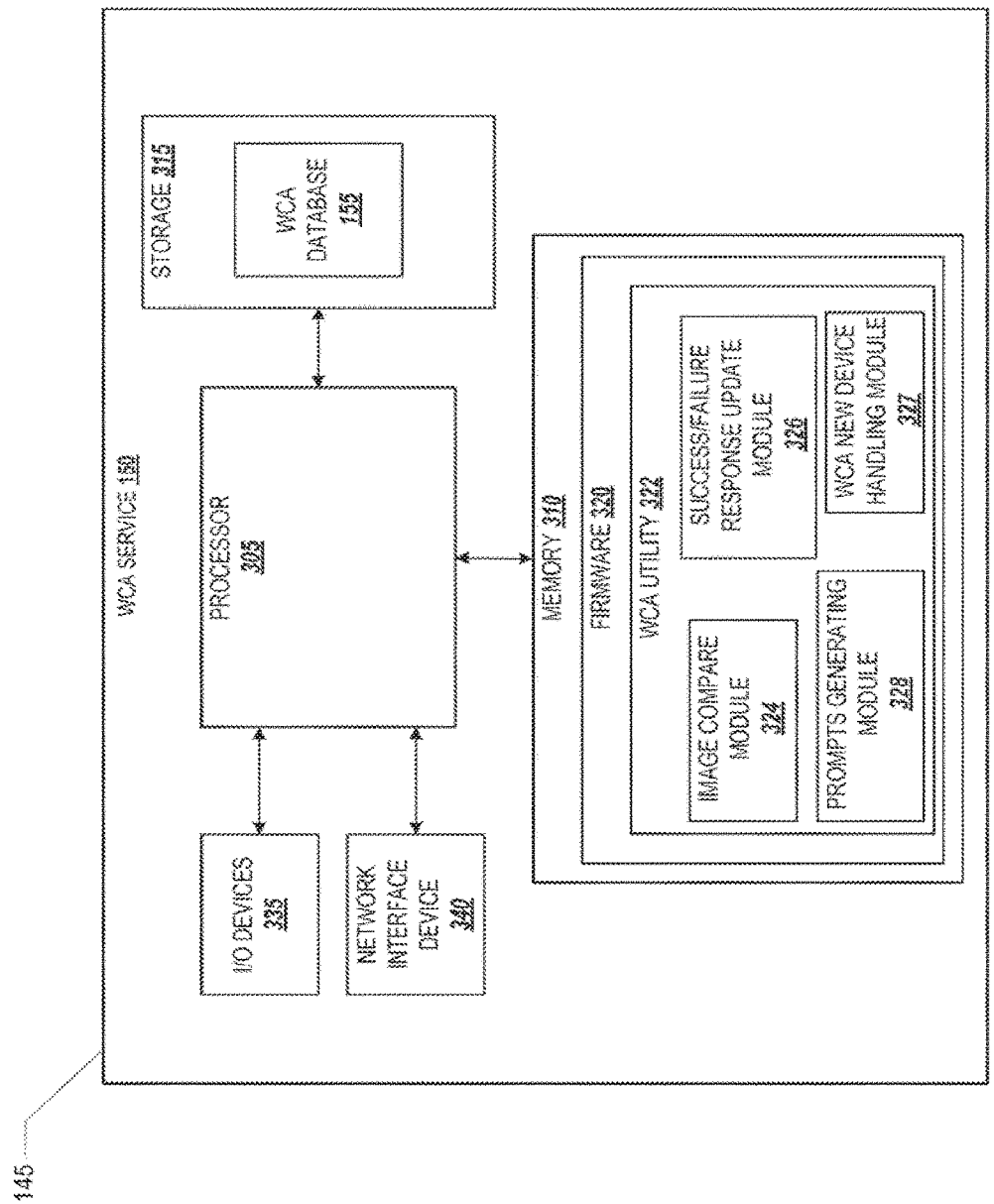
FIG. 3 provides a more detailed view of the functional makeup of the example remote WCA service, which maintains a WCA database of wireless device images and associated WCSC instructions, in accordance with one or more embodiments.

FIG. 3 provides a more detailed view of the functional makeup of the example remote WCA service 150, which maintains a WCA database 155 of wireless device images and associated WCSC instructions, in accordance with one or more embodiments. WCS service 150 is hosted on remote server 145. Remote server 145 is configured with processor 305, which is coupled to memory 310 and storage 315 via a system interconnect or bus (shown as bidirectional arrows). Also coupled to processor 305 are one or more I/O devices 335 and network interface device 340, which enables communication with or via an external network. WCA database 155 is maintained within storage 315, in the illustrated embodiment.

As further illustrated by FIG. 4, WCA database 155 can be a data structure, such as a table, that includes a series of columns and rows within which are stored descriptive information about the various types of second devices that have been identified and for which connectivity data and/or instructions are known. An identifier of each of a plurality of second devices and corresponding information associated with the second device are presented within each row within WCA database 155. The first column of WCA database 155 provides the manufacturer 402 of the various second devices represented within WCA database 155. Columns 2 through 7 then provide model device type 404, MAC ID 406, correlation score 408, image 1 410 through image N 412, and WCSC instructions 414 for each of the manufacturers identified in column 1. Image 1 410 though image N 412 represents a plurality of different views for a single device that can be utilized to identify the device and subsequently retrieve the WCSC instructions. According to one embodiment, the number of different views for each device can vary based on images received from users of the service, and certain devices may have only a single view while other devices can have multiple views associated therewith. Also, according to one aspect, WCA service 150 updates WCA database 155 whenever a new image is received that has a high correlation to identifying the particular device. Correlation score 408 provides a value between an established range (e.g., 0 to 5) which identifies the level of correlation between a particular image for a corresponding device and the correctness of the WCSC instructions to enable pairing with the second device based on receipt of the image.

It is appreciated that the WCA database 155, including the content and specific sequencing of information within each row, is provided solely for example. Other formats and configurations or layouts of different embodiments of WCA databases can be implemented in one or more alternate embodiments. For example, while only a single device is identified for each manufacturer, it is understood that each manufacturer can have a plurality of devices each having a separate row entry within WCA database 155. Also, a single second device can have different entries within WCA database 155 based on the type of first device to which the second device is being paired. WCA database 155 can thus have a plurality of entries with different variations for each second device.

Returning to FIG. 3, firmware 320 is stored within memory 310 and includes WCA utility 322. WCA utility 322 includes several functional components including image compare module 324, success/failure response module 326, WCA new device handling module 327, and prompts generating module 328. Aspects of the processing completed by WCA service 150 are presented within the description of FIG. 6.

Figure 5:
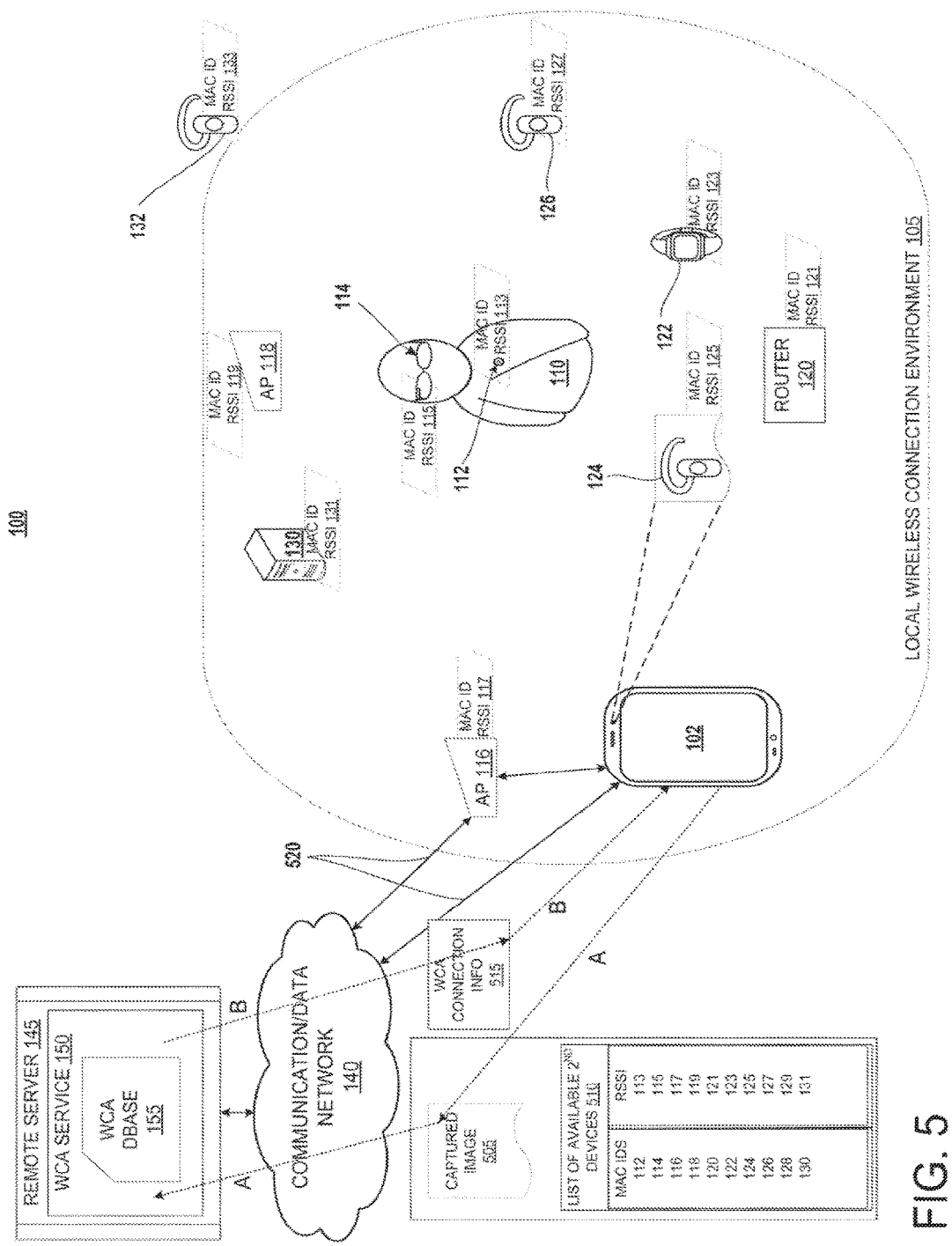
FIG. 5 illustrates an example wireless connectivity assist (WCA) database maintained at the example WCA service, in accordance with one embodiment.

FIG. 5 provides another view of device pairing environment 100, illustrating directional flow of various information packages or message transfer between first device 102 and WCA service 150, during active pairing setup of first device 102 with an example second device, Bluetooth headset 124. The layout and components or devices within the device pairing environment have been presented above in the description of FIG. 1. Within the FIG. 5 illustration, first BT headset 124 represents a selected second device and for purposes of the description herein of an illustrative embodiment, selected second device is assumed to be first BT headset 124. For better connectivity across the descriptions of the remaining figures, additional functional description of FIG. 5 will be presented along with the descriptions of the flow charts of FIGS. 6 and 7.

Figure 6:
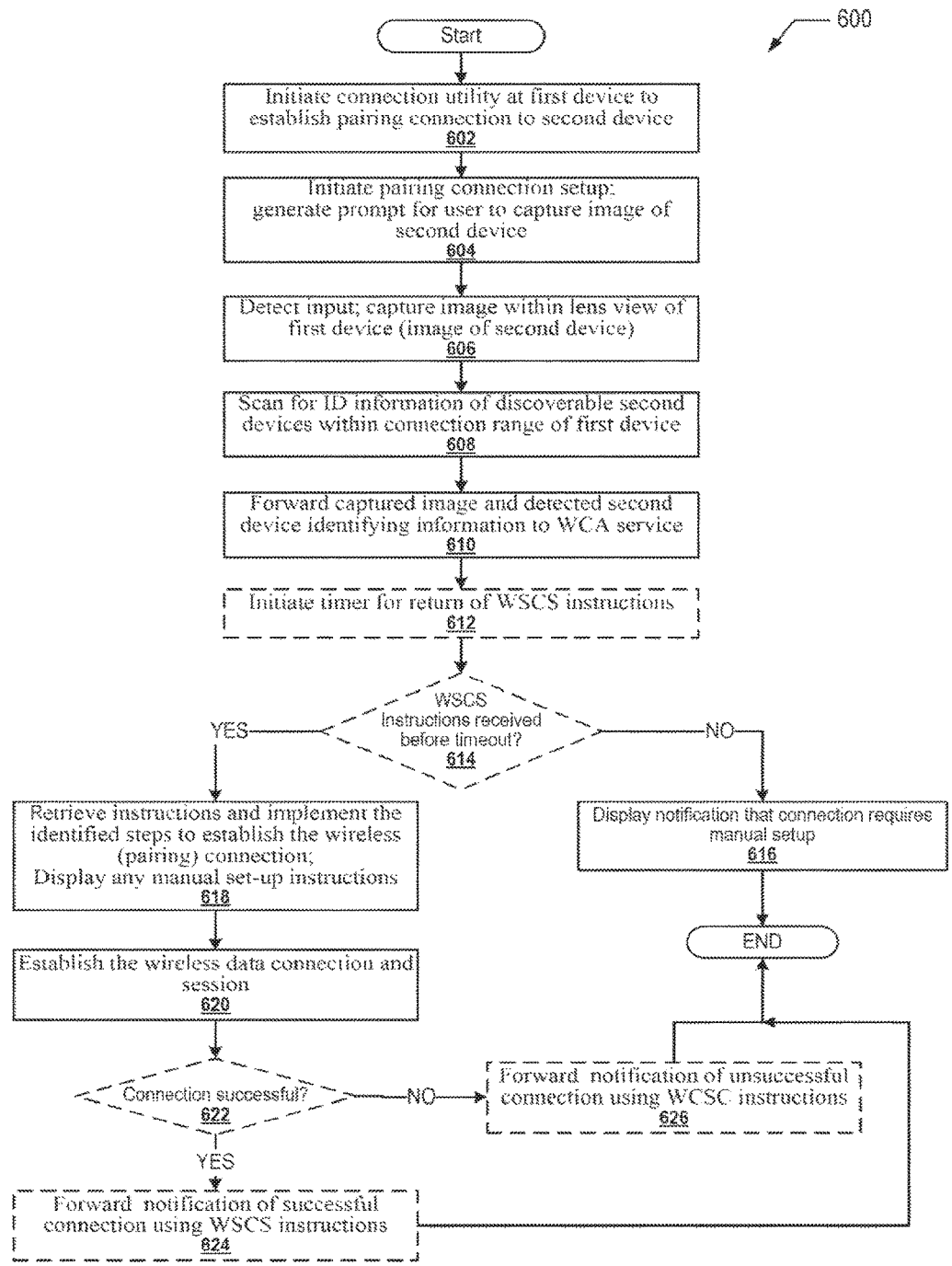
FIG. 6 provides a flow chart of a method for configuring a wireless connection to a second device using a captured image of the second device and WCSC instructions received from a WCA service, in accordance with one embodiment.

FIG. 6 provides a flow chart of a method for configuring a wireless connection to a second device using a captured image of the second device and WCSC instructions received from a WCA service, in accordance with one embodiment. Specifically, the method facilitates establishment of wireless pairing connections between wireless electronic devices. According to the illustrative embodiment, the various aspects of the method are performed by processor 202 (FIG. 2) executing code and software modules. The method 600 begins at the start block and proceeds to block 602 which provides for initiating, at a first device 102, a connection utility 212 that enables the first device 102 to establish a wireless connection with at least one second device (e.g., 124). At block 604, the connection utility initiates a connection setup process and generates a prompt for a user to initiate image capture of the selected second device. Then, in response to receiving an input to initiate an image capture, the method captures an image of a selected second device (block 606). The selected second device represents a second device to which a wireless connection is desired. With the image of the second device captured, method 600 includes scanning for identifying information about each discoverable second device that is within a connection range of the first device (block 608). The method further includes forwarding the captured image 505 and any detected identifying information (510) to a wireless connectivity assist (WCA) service 150 (block 610). According to one or more embodiments, and as illustrated by FIG. 5, a list of the detected and/or available second devices 510 is compiled and transmitted along with the captured image 505 over dashed path A to WCA service 150. As further shown, the detected identifying information includes a machine identifier MAC ID of each detected second device and a corresponding received signal strength indicator (RSSI) of the MAC ID. In the figure, the dashed paths A and B are illustrative of a communication channel that extends over one of the two wireless connections 520 between first device 102 and remote server 145 via communication and data network 140.

Returning to FIG. 6, according to one embodiment, method 600 can include a number of optional steps, which are identified with dashed lines. Thus, concurrently with or following the forwarding of the captured image and the identifying information to the WCA service, method 600 further includes initiating a timer for return of the WCSC instructions (block 612). Method 600 includes monitoring for one of (a) expiration of the timer and (b) receipt of the WCSC instruction, whichever occurs first (decision block 614). When the timer expires prior to receiving any WCSC instructions, method 600 includes displaying a notification that the connection requires a manual setup (block 616). However, when the WCSC instructions are received prior to expiration of the timer, method 600 includes retrieving the instructions and implementing a series of setup steps identified in the instructions to establish the wireless connection (block 618). Further, when the received WCSC instructions include only instructions for manual setup and configuration, method 600 includes displaying the instructions on a display of the first device to enable a user to manually implement the setup of the wireless connection. Method 600 further includes establishing the wireless connection with the selected second device when wireless connection setup and configuration (WCSC) instructions are received from the WCA service (block 620).

Also, in response to a successful completion of the wireless connection following the user selection, method 600 includes forwarding a verification of the association to the WCA service 150 to trigger an update of the WCA database 155. Thus, when the wireless connection is successfully established using the WCSC instructions, as determined at decision block 622, method 600 can optionally include forwarding, to the WCA service, a notification indicating successful connection (block 624). However, when the wireless connection is not successfully established using the WCSC instructions, method 600 includes forwarding, to the WCA service, a notification indicating connection failure (block 626). In one implementation, prior to forwarding notification of one of successful or unsuccessful connection, the method includes: displaying a prompt requesting a user indication of whether the received WCSC instructions facilitated a successful wireless connection with the selected second device; and selecting from among notification of successful or unsuccessful connection based on the user's response to the prompt. Also, in one embodiment, forwarding of notification of unsuccessful connection further comprises: prompting for entry of additional identifying information about the selected second device. This enables the user to provide the required details that may be needed to properly identify the selected second device. In at least one embodiment, the user provided information is transmitted back to the WCA service in order to improve the accuracy of future detection of similar second devices. Method 600 then terminates at the end block.

According to one embodiment, scanning for information about each discoverable second device includes: retrieving and displaying detected identifying information on a display of the first electronic device. The method then further includes, in response to receiving both the captured image and a user selection of a specific one of the identifying information: associating the captured image with the selected identifying information and forwarding the association to the WCA service 150 for processing.

According to one or more embodiments, the method can include: receiving from the WCA service a request for manual entry of additional details about the selected second device; generating a prompt requesting user input of the other requested details; and forwarding, to the WCA service, any other requested details received in response to the prompt. In at least one embodiment, the other requested details comprise at least one of a request for a different image of the selected second device and a request for entry of device identifier information from among one of a manufacturer, model number, serial number and type of device.

Figure 7:
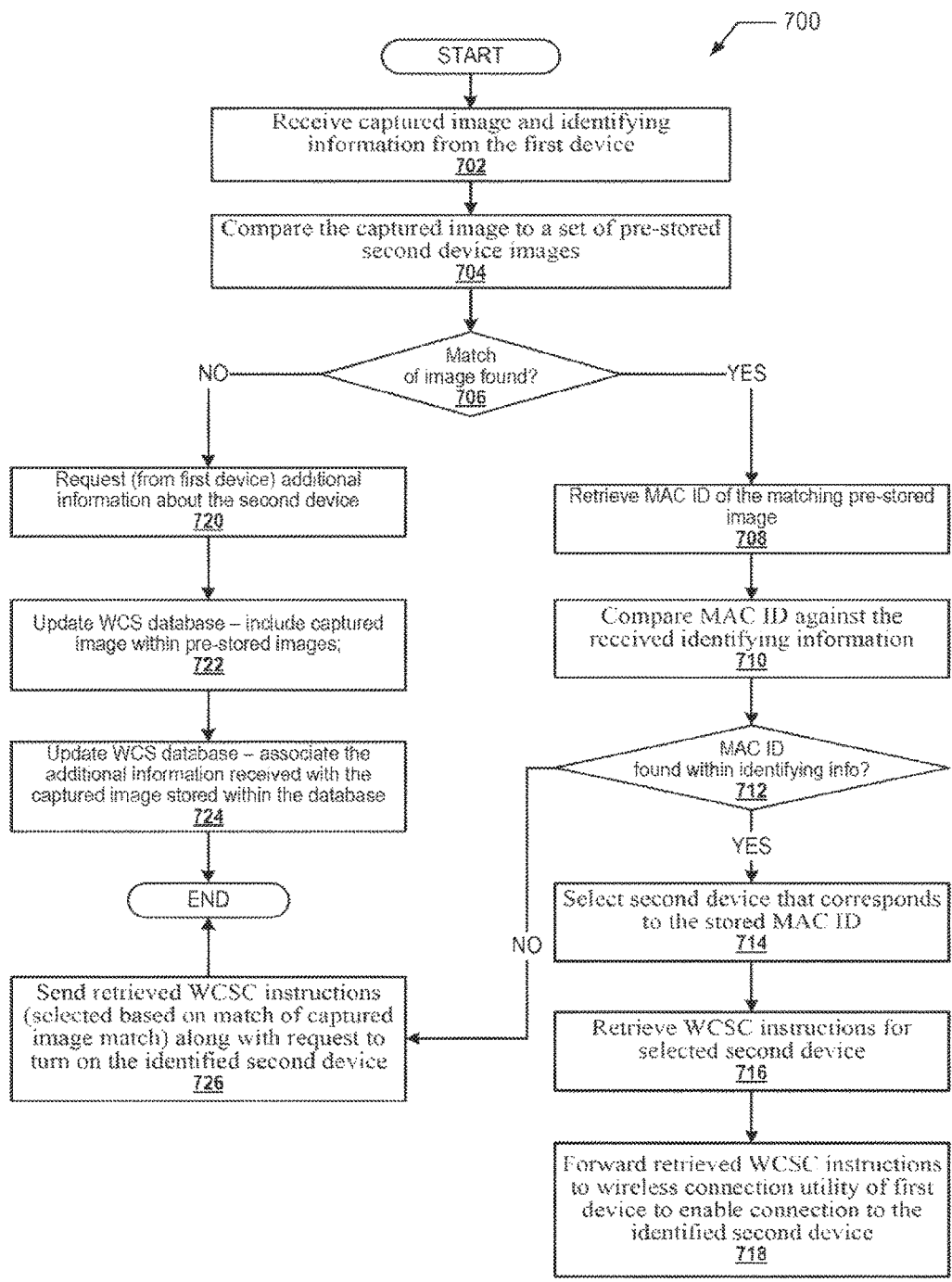
FIG. 7 is a flow chart of a method implemented by the WCA service to identify second devices and provide correct WSCS instructions based on evaluating received images and to update the WCA database based on received responses, in accordance with one or more embodiments.

FIG. 7 provides a flow chart of a method implemented by the WCA service 150 to identify second devices and provide correct WSCS instructions based on evaluating received images and to update the WCA database 155 based on received responses, in accordance with multiple embodiments. It is appreciated that the various processes provided by method 700 can be implemented at or on WCA server 145 or within first device 102 in alternate embodiments. Thus, in the illustrative embodiment, WCA service 150 is provided at a remote server 145 hosting the WCA service 150, which is remotely accessed by first device 102 to determine whether the connection instructions for the second device can be acquired based on a match of a captured image of the second device within the WCA database 155.

According to one alternate embodiment, the WCA service 150 and/or certain functional modules of WCA utility 322 (FIG. 3.) execute on processor 202 within the first device 102, rather than at the remote server 145. In this specific implementation, method 700, which is processed as shown in FIG. 7, includes: receiving the captured image and the identifying information (block 702); comparing the captured image to a set of pre-stored images of second devices (block 704); and determining at decision block 706 whether a match is found of the captured image within the WCA database. It is appreciated that the match can be a partial match as the angle at which the image is taken may not be identical to the stored image/s of the second device, but may provide sufficient details to within some percentage of assurance (e.g., 70%) that the captured image is of the particular second device. In response to identifying a match of the captured image to at least one of the pre-stored images, as determined at decision block 706, method 700 further includes: retrieving a stored MAC ID associated with the matching pre-stored image (block 708); comparing the MAC ID against the received identifying information detected by the first device (block 710); and determining at decision block 712 if the stored MAC ID matches one of the MAC IDs found within the received identifying information. When the stored MAC ID is identified as being one of the detected MAC IDs within the received identifying information, method 700 includes selecting a second device corresponding to the stored MAC ID (block 714). Method 700 then includes retrieving the WCSC instructions associated with the corresponding second device having the matching pre-stored image (block 716); and forwarding the retrieved WCSC instructions to the wireless connection utility of the first device to complete the setup of the wireless connection with the selected second device (block 718).

Returning to decision block 706, in response to not finding a match of the captured image with the pre-stored images, method 700 further includes: requesting additional information about the selected second device (block 720); and updating the database by adding the captured image to the pre-stored images (block 722). Method 700 further includes associating any additional information received in response to the first request with the stored captured image (block 724). Next, the method ends.

Returning to decision block 712, method 700 further includes: in response to not finding a manufacturer-provided MAC ID or name for the selected second device within the identifying information, providing the WCSC information along with a request to place the selected second device in at least one of a powered-up mode and a MAC ID broadcast mode (block 726). Method 700 then ends.

Figure 8:
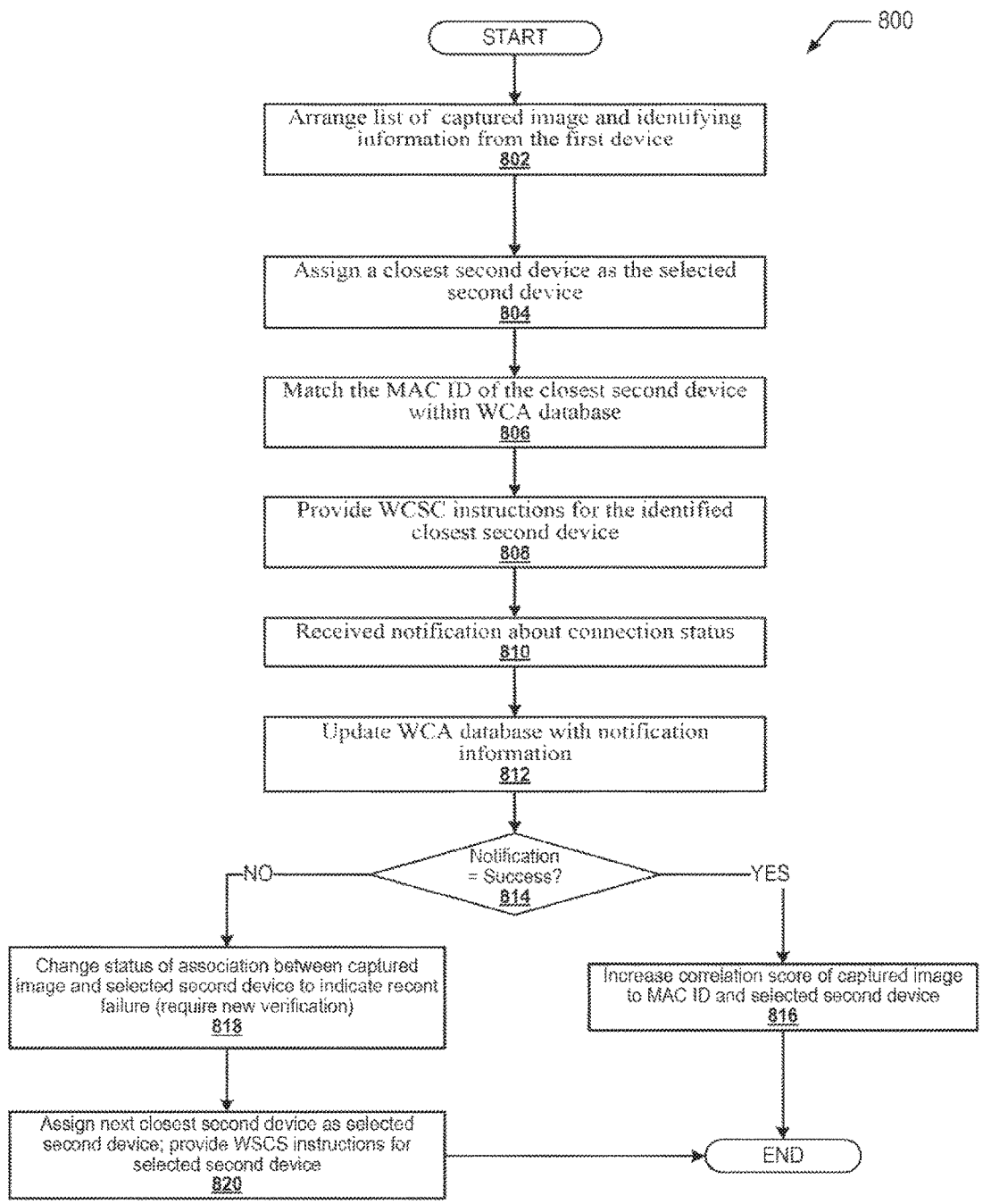
FIG. 8 is a flow chart illustrating a method by which the WCA service selects a second device based on the RSSI values received and updates a correlation score based on success or failure of the pairing connection, in accordance with one embodiment.

FIG. 8 provides a flow chart illustrating the method 800 by which the WCA service 150 selects a second device based on the RSSI values received with the identifying information, in response to not receiving a selection of a MAC ID with the captured image. Method 800 begins at start block and includes: arranging a list of detected second devices in order based on retrieved RSSI values (block 802); and assigning a closest second device as the selected second device (block 804). Method 800 further includes matching the MAC ID of the closest second device within the WCA database (block 806); and providing the WCSC instructions for the closest second device (block 808). Additionally, method 800 can also include: receiving one of a first notification of successful connection and a second notification of a failed connection from the connection utility (block 810); and updating the WCA database based on a received notification (block 812). Specifically, when it is determined at decision block 814 that the first notification (i.e., a successful connection) is received, method 800 includes increasing a correlation score of the captured image to the MAC ID and the selected second device (block 816). Method 800 then ends.

When the second notification (i.e., a failed connection) is received, method 800 includes changing a status of an association between the captured image and the selected second device to a "recently failed" status requiring new verification (block 818). In one embodiment, method 800 optionally includes: in response to receiving the second notification indicating a failed connection, assigning a next closest second device as the selected second device and providing WCSC instructions for that next closest second device (block 820). Method 800 then ends.

In the flow charts of FIGS. 6-8 presented herein, certain processes of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method, comprising:
    initiating, at a first electronic device, a connection utility configured to allow the first electronic device to establish a wireless connection with a second electronic device;
    capturing an image associated with the second electronic device to which a wireless connection is desired;
    forwarding the captured image to a wireless connectivity assist (WCA) service;
    receiving wireless connection setup and configuration (WCSC) instructions based at least in part on the captured image from the WCA service; and
    establishing the wireless connection with the second electronic device utilizing the WCSC instructions received from the WCA service.

2. The method of claim 1, wherein initiating the connection utility comprises initiating a connection setup process on the first electronic device, and wherein the connection setup process is configured to generate a prompt on the first electronic device to capture the image associated with the second electronic device.

3. The method of claim 1, wherein capturing an image associated with the second electronic device comprises capturing an image of the second electronic device.

4. The method of claim 1, comprising obtaining additional identifying information relating to the second electronic from the second electronic device.

5. The method of claim 4, wherein forwarding the captured image to the WCA service comprises forwarding the captured image and the additional identifying information to the WCA service.

6. The method of claim 4, wherein obtaining the additional identifying information relating to the second electronic comprises receiving an identification code of the second electronic device.

7. The method of claim 6, wherein receiving the identification code of the second electronic device comprises receiving a machine identifier (MAC ID) of the second electronic device.

8. The method of claim 4, comprising associating the captured image with a selectable subset of the additional identifying information relating to the second electronic device prior to forwarding the captured image and the additional identifying information to the WCA service.

9. The method of claim 1, wherein receiving the WCSC instructions comprises receiving the WCSC instructions during a specified period of time.

10. The method of claim 1, comprising scanning for additional identifying information relating to each of a plurality of discoverable electronic devices within a communication range of the first electronic device, wherein the plurality of discoverable electronic devices comprises the second electronic device.

11. An electronic device, comprising:
    a processor configured to:
        initiate a connection utility configured to allow the electronic device to establish a
        wireless connection with a second electronic device;
        cause the electronic device to capture an image associated with the second electronic device to which a wireless connection is desired;
        forward the captured image to a wireless connectivity assist (WCA) service;
        receive wireless connection setup and configuration (WCSC) instructions based at least in part on the captured image from the WCA service; and
        establish the wireless connection with the second electronic device utilizing the WCSC instructions received from the WCA service.

12. The electronic device of claim 11, wherein the processor is configured to obtain additional identifying information relating to the second electronic from the second electronic device.

13. The electronic device of claim 12, wherein the processor is configured to forward the captured image and the additional identifying information to the WCA service.

14. The electronic device of claim 12, wherein the processor is configured to receive an identification code of the second electronic device as the additional identifying information.

15. The electronic device of claim 14, wherein the processor is configured to receive a machine identifier (MAC ID) of the second electronic device as the identification code.

16. A memory having computer executable code stored thereon, the code comprising instructions to:

cause a processor of a first electronic device to initiate a connection utility configured to allow the first electronic device to establish a wireless connection with a second electronic device;

cause the processor to receive a captured image associated with the second electronic device to which a wireless connection is desired;

cause the processor to forward the captured image to a wireless connectivity assist (WCA) service;

cause the processor to receive wireless connection setup and configuration (WCSC) instructions based at least in part on the captured image from the WCA service; and cause the processor to establish the wireless connection with the second electronic device utilizing the WCSC instructions received from the WCA service.

17. The memory of claim 16, wherein the code comprises instructions to cause the processor to obtain additional identifying information relating to the second electronic from the second electronic device.

18. The memory of claim 17, wherein the code comprises instructions to cause the processor to forward the captured image and the additional identifying information to the WCA service.

19. The memory of claim 16, wherein the code comprises instructions to cause the processor to establish a period of time for receiving the WCSC instructions.

20. The memory of claim 16, wherein the code comprises instructions to cause the processor to scan for additional identifying information relating to each of a plurality of electronic devices within a communication range of the first electronic device, wherein the plurality of electronic devices comprises the second electronic device.

\* \* \* \* \*

UNITED STATES PATENT AND TRADEMARK OFFICE
CERTIFICATE OF CORRECTION

PATENT NO. : 9,867,218 B2
APPLICATION NO. : 15/144555
DATED : January 9, 2018
INVENTOR(S) : Debates et al.

Page 1 of 1

It is certified that error appears in the above-identified patent and that said Letters Patent is hereby corrected as shown below:

In the Claims

Claim 4, Column 12, Lines 19-20, please delete "the second electronic from" and insert --the second electronic device from--;

Claim 12, Column 12, Line 65, please delete "the second electronic from" and insert --the second electronic device from--;

Claim 17, Column 14, Lines 9-10, please delete "the second electronic from" and insert --the second electronic device from--.

Signed and Sealed this
Third Day of April, 2018

Andrei Iancu
*Director of the United States Patent and Trademark Office*